United States Patent
Werntz et al.

(10) Patent No.: US 7,324,042 B2
(45) Date of Patent: Jan. 29, 2008

(54) MONOSTATIC RADAR BEAM OPTIMIZATION

(75) Inventors: Paul C. Werntz, Long Beach, CA (US); John J. Wooldridge, Manhattan Beach, CA (US)

(73) Assignee: The Boeing Company, Chicago, IL (US)

( * ) Notice: Subject to any disclaimer, the term of this patent is extended or adjusted under 35 U.S.C. 154(b) by 248 days.

(21) Appl. No.: 11/274,372

(22) Filed: Nov. 15, 2005

(65) Prior Publication Data

US 2007/0109179 A1    May 17, 2007

(51) Int. Cl.
*G01S 13/90* (2006.01)
*G01S 7/40* (2006.01)

(52) U.S. Cl. .............. 342/174; 342/25 R; 342/195; 342/159; 342/25 F

(58) Field of Classification Search .............. 342/25 R, 342/25 F, 81, 154, 157, 158, 159–162, 195, 342/200–204, 368–377
See application file for complete search history.

(56) References Cited

U.S. PATENT DOCUMENTS

| | | | | |
|---|---|---|---|---|
| 4,720,712 A | * | 1/1988 | Brookner et al. ............ 342/383 |
| 4,784,147 A | * | 11/1988 | Moshfeghi ................... 600/425 |
| 5,251,186 A | * | 10/1993 | Lockwood ................... 367/103 |
| 6,031,877 A | * | 2/2000 | Saunders ..................... 375/267 |
| 6,160,398 A | * | 12/2000 | Walsh ......................... 324/309 |
| 6,665,545 B1 | * | 12/2003 | Raleigh et al. ............ 455/562.1 |
| 6,680,699 B2 | * | 1/2004 | Voyer ......................... 342/378 |
| 6,946,992 B2 | * | 9/2005 | McCleary et al. .......... 342/368 |
| 2003/0052819 A1 | * | 3/2003 | Jacomb-Hood et al. ..... 342/379 |
| 2003/0198340 A1 | * | 10/2003 | Picciolo et al. ........ 379/406.01 |
| 2003/0204378 A1 | * | 10/2003 | Cai ............................. 702/189 |
| 2004/0018818 A1 | * | 1/2004 | Hottinen et al. ............... 455/78 |
| 2006/0105321 A1 | * | 5/2006 | Moy et al. ...................... 435/4 |
| 2006/0114148 A1 | * | 6/2006 | Pillai ........................... 342/195 |
| 2007/0080855 A1 | * | 4/2007 | Gerlach et al. ............. 342/195 |
| 2007/0109179 A1 | * | 5/2007 | Werntz et al. ............... 342/174 |

* cited by examiner

*Primary Examiner*—John B Sotomayor
(74) *Attorney, Agent, or Firm*—Klein, O'Neill & Singh, LLP

(57) ABSTRACT

A method and system for optimizing transmit beam and receive beam antenna radiation patterns. The method includes inputting initial estimate of beam weights for a transmit beam and a receive beam to an optimizer; and using a cost function to optimize beam weights so that a response peaks in a main region and is minimized in a sidelobe region; wherein the cost function is based on using receive beam and transmit beam characteristics.

12 Claims, 11 Drawing Sheets

MONOSTATIC RADAR BEAM OPTIMIZATION

CROSS REFERENCE TO RELATED APPLICATIONS

None

BACKGROUND OF THE INVENTION

1. Field of the Invention

The present invention relates generally to antennas and, more particularly, to multibeam phased array antennas.

2. Background

The monostatic radar uses a transmit and receive beam of RF energy. The transmit beam illuminates a target scene. The received beam is formed from echoes of the transmitted energy that are reflected from the target. Energy in the sidelobe region of the transmit beam (energy not directed toward the target of interest) is reflected off additional obstacles and that energy is then received by the sidelobe portion of the receive beam causing a response that interferes with the signal from the desired target. The interference is called clutter. Clutter reduces the sensitivity of the radar system.

Multiple beam (multibeam) phased array antennas are well known and may be employed in a wide variety of applications. Applications that transmit to land or earth surface have sidelobes in the transmit and receive mode. The side lobes in the transmit mode radiate energy and illuminate targets that are off the main lobe of the beam axis (shown as 212 in FIG. 2) of radiation. Energy is returned from these off-axis targets along with energy from the on axis, main lobe. The energy returning from the off-axis targets is indistinguishable from energy returning from the main lobe. The energy from the off-axis beam appears in a display as clutter and noise. As the amount of clutter increases, it becomes more difficult, and finally impossible, to distinguish the targets that are of interest. The resolution of the subject radar is thereby impaired by the clutter contribution to the returned signal.

Signals received from sidelobe energy typically have 40 dB to 60 dB in gain below the gain of signals received by a main lobe. Taylor weighting is a method of assigning taper values to particular elements in an array to reduce the sidelobes of the transmitted beam.

In a typical SAR (Synthetic Aperture Array) radar, a particular target appears on the screen or in the data stream for processing for certain duration. During this time, the target may be captured several hundred times with successive transmissions. Data relating to the target is stored over the time interval. The data obtained relating to a target is summed or integrated giving the effect of having been painted by an antenna having a very large diameter. If the beam diameter is 10 feet and the integration process takes place over a mile of closing distance, the antenna is huge and the resolution which is the wavelength of the signal divided by the diameter becomes very small. For a SAR to operate in this manner, information received from sidelobe transmissions must be at least 60 dB below the product of the transmitted main lobe energy (TXmain) and received main lobe energy (RXmain). Signals received from sidelobe energy typically have 40 dB to 60 dB in gain below the gain of signals received by a main lobe.

Taylor weighting is a method of assigning taper values to particular elements in an array to reduce the sidelobes of the transmitted beam. A normal Taylor weighted taper is difficult to produce that provides sidelobe received signals that are 60 dB or more below comparable reflections from the TXmain and RXmain lobes.

Prior optimization methods were used to limit the sidelobe levels and clutter but these techniques optimized the transmit or receive beam separately in isolation. Specific features of the transmit beam, such as peaks and nulls were not exploited in the optimization of the receive beam characteristic. The problem of clutter isolation was limited by a failure to exploit a previous knowledge of the transmit beam, receive beam and scattering environment during optimization of the parameters of the receive and or transmit beam characteristics. Therefore, there is a need for a method and system for optimizing transmit/receive bema weights.

SUMMARY OF THE INVENTION

In one aspect of the present invention, a method for optimizing transmit beam and receive beam antenna radiation patterns is provided. The method includes inputting initial estimate of beam weights for a transmit beam and a receive beam to an optimizer; and using a cost function to optimize beam weights so that a response peaks in a main region and is minimized in a sidelobe region; wherein the cost function is based on using receive beam and transmit beam characteristics.

In another aspect of the present invention, a method for a radar system is provided. The method includes, providing a transmit beam taper function and a receive beam taper function; initializing the transmit beam taper function with a transmit set of values and the receive beam transmit function with a receive set of values; normalizing the transmit beam function and the receive beam function to obtain normalized transmit beam and receive beam gain weights that span a predetermined range of angles on either side of an antenna bore sight axis, using a cost factor function to determine cost factor values and reciprocal cost factor values, determining if all cost factor values exceed a predetermined number; and incrementing the transmit beam set of values and the receive beam set of values so that a radar response is minimum in a sidelobe region.

In yet another aspect, a system for optimizing transmit beam and receive beam antenna radiation patterns is provided. The system, includes a processor executing code receives initial estimate of beam weights for a transmit beam and a receive beam; and uses a cost function for optimization so that radar response peaks in a main region and is minimized in a sidelobe region; wherein the cost function is based on using receive beam and transmit beam characteristics.

This brief summary has been provided so that the nature of the invention may be understood quickly. A more complete understanding of the invention can be obtained by reference to the following detailed description of the preferred embodiments thereof in connection with the attached drawings.

BRIEF DESCRIPTION OF THE DRAWINGS

The foregoing features and other features of the present invention will now be described with reference to the drawings of a preferred embodiment. In the drawings, the same components have the same reference numerals. The illustrated embodiment is intended to illustrate, but not to limit the invention. The drawings include the following figures.

DETAILED DESCRIPTION OF THE PREFERRED EMBODIMENTS

Figure 1:
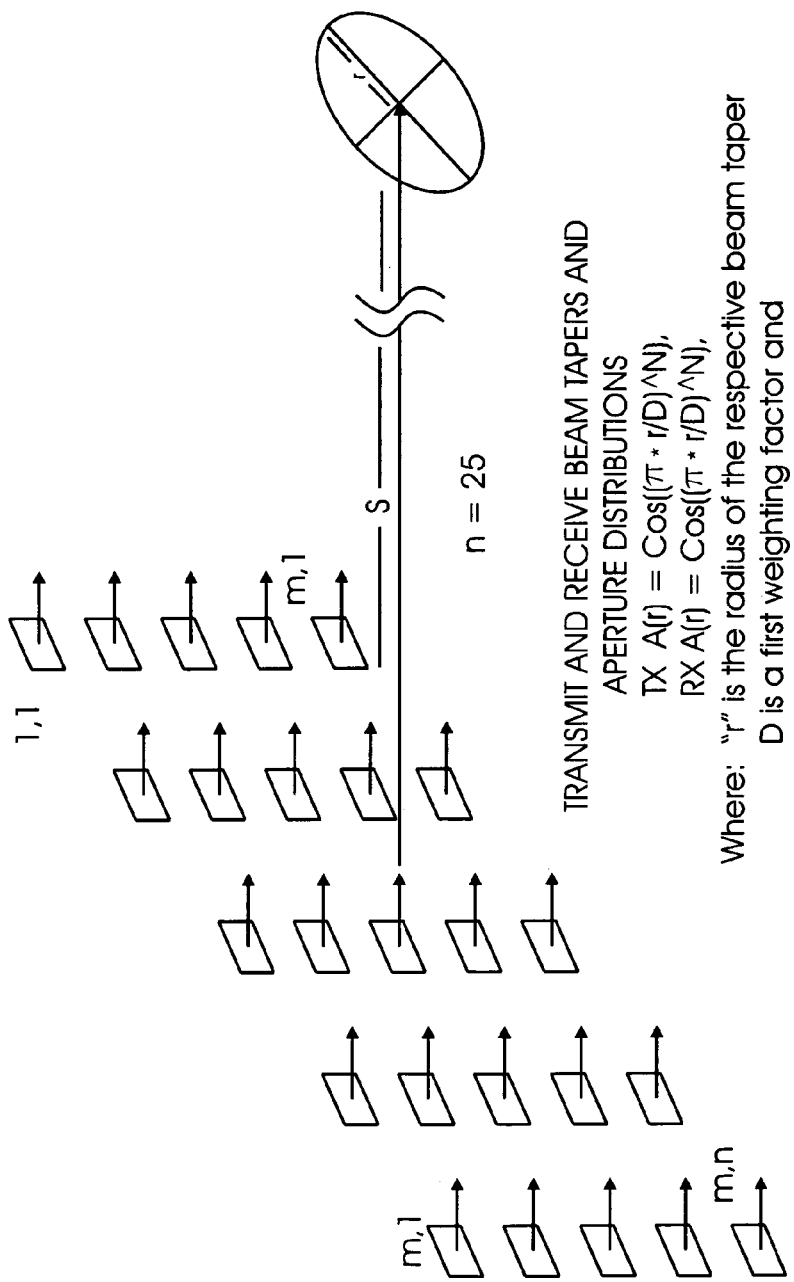
FIG. 1 is a schematic representation illustrating a multi-beam array of active elements forming the antenna of a SAR used in accordance with an embodiment of the present invention.

In one aspect the present invention provides an optimization process that optimizes the receive and/or the transmit beam characteristics (main beam and sidelobe) as a function of both the transmit and receive beam characteristics. The optimizer function, or cost factor/cost function (may be referred to as cost factor CF and/or cost function CF), that is used in the optimization process, results in movement of the receive beam sidelobes into the null locations of the transmit beam.

The cost function CF is adaptive and uses computer models of the taper of the transmit beam and the receive beam. The optimization can be extended to include amplitude, and full azimuth/elevation coverage.

In another aspect of the present invention, each element in the array of elements has a digitally addressable attenuator and a digitally addressable phasor for modifying the taper and the relative phase angle of the transmitted or received signal that is being processed by that respective element. The array controller independently controls the phase and the amplitude of each respective element during the transmit interval and during the subsequent receive interval.

Each transmit pattern and each receive pattern has a main beam lobe and corresponding sidelobes. An optimum response, which has not been achieved before using Taylor weighting, means that the radar response or sensitivity is peaked in the main beam or target region and minimized in the sidelobe region of both the transmit and receive patterns. Shaping the taper of the transmit beam and the receive beam with the use of the cost factor and an optimizer process as presented herein makes it possible, for the first time, to optimize the radar response or sensitivity by moving the sidelobes of the transmit beam into the dwell locations of the receive beam.

In the subject system, the transmitted phase and amplitude of the signal leaving a particular transmitting element during the transmit mode can be different from the phase and gain of the active element during the duration of the following receive mode interval. The element attenuators are initialized with a first set of coefficients that determine the taper of the whole transmitted beam. At the conclusion of transmission, the element attenuators are initialized with a second set of coefficients that adjust the taper of the received beam. Each element attenuator receives a digital command from the array controller before the transmit mode is initiated and a second command before the receive mode is initiated. The phasor in each active element responds to the digital command that it receives from the controller by pointing the radar transmit beam or the receive beam to a new transmit or receiving angle with respect to the bore sight axis of the system.

A radar built for a modern application would typically have each element digitally controlled with a five bit word controlling the attenuator amplitude and a five bit word controlling the phase of each phase shifter, the five bit coefficients from each being different for the transmit and the receive modes. The repeatability of the antenna properties for a modern antenna make it possible to analyze single antenna in a family to determine the coefficients to be used and to then use the same set of coefficients in all subsequent manufactured models.

The taper of the transmit sidelobe and the receive sidelobe is modeled in the setup process by evaluating the Fourier integral of the transmit taper and of the receive taper. The Fourier Integral of the tapers provides the far field response values (TX for transmit beam and RX for receive beam), each data set characterizing the response over an angle field. Corresponding values of TX and RX are then normalized and inserted into the cost factor algorithm. The cost factor algorithm is mapped into a 1/CF field which is used to evaluate how the values of the attenuator coefficients should be changed to optimize the 1/CF function. If the values of the 1/CF algorithm are not above a predetermined limit, the process returns to the step of incrementing the coefficients for the 128 attenuator elements. The process has the effect of moving the sidelobes of receive and transmit beams so that the first peak of the first transmit sidelobe is in the valley of the first receive lobes. The iterative process continues until transmit peaks fall in valleys of the receive sidelobes and receive peaks fall into valleys of the transmit sidelobes.

Antenna systems that are initialized and calibrated using the subject invention typically find application in a manned or un-manned aircraft or cruise vehicle using a SAR to find houses, trucks or other vehicles on the ground. The radar is mounted in a moving vehicle which could be a plane, satellite, missile etc. When the radar is mounted on the side of a missile, the missile motion provides the beam scan.

In one aspect, the SAR radar has an array of active elements that transmit an RF beam of narrow dimension in cross-section to a target field bounded or framed by a viewing aperture. The form or shape of the beam is typically that of a narrow cylinder similar to a flashlight, or pencil beam. The application of this invention contemplates that the RF beam from the antenna system is a pulsed oscillator beam to an on-state during a transmit mode for a relatively short duration of time after which the system enters a receive mode. During the receive mode, the receiver waits and receives reflected signals from the illuminated targets on the RF beam axis. The beam axis is continually scanned in the direction a target is moving.

The transmitted beam or the RF beam has an axis that typically scans the pre-determined aperture area in lines transverse to the path of movement of the aircraft or cruise vehicle carrying the subject radar set. The azimuth axis of the beam is moved from one angular direction to the next angular direction by the motion of the vehicle.

FIG. 1 shows an example of an antenna array used according to one aspect of the present invention. The radar beam shown in FIG. 1 has a length S with a circular cross section having a radius "r" in the region of the target. A typical multibeam phased array antenna paints the target region bordered by a synthetic aperture or window by scanning the aperture space with a continuous pattern of beams, each beam comprising a transmission or pulse followed by an interval for receiving return signals through the aperture, the aperture having opposing edges. After each transmission of a pulse and return interval, the axis of the beam is moved through a small angle to a new angle from the previous transmission before beginning a subsequent transmission and receive interval. After a predetermined number of transmission and receive intervals, the axis of the beam reaches the boundary of the aperture and is retraced to the opposing edge.

Figure 2:
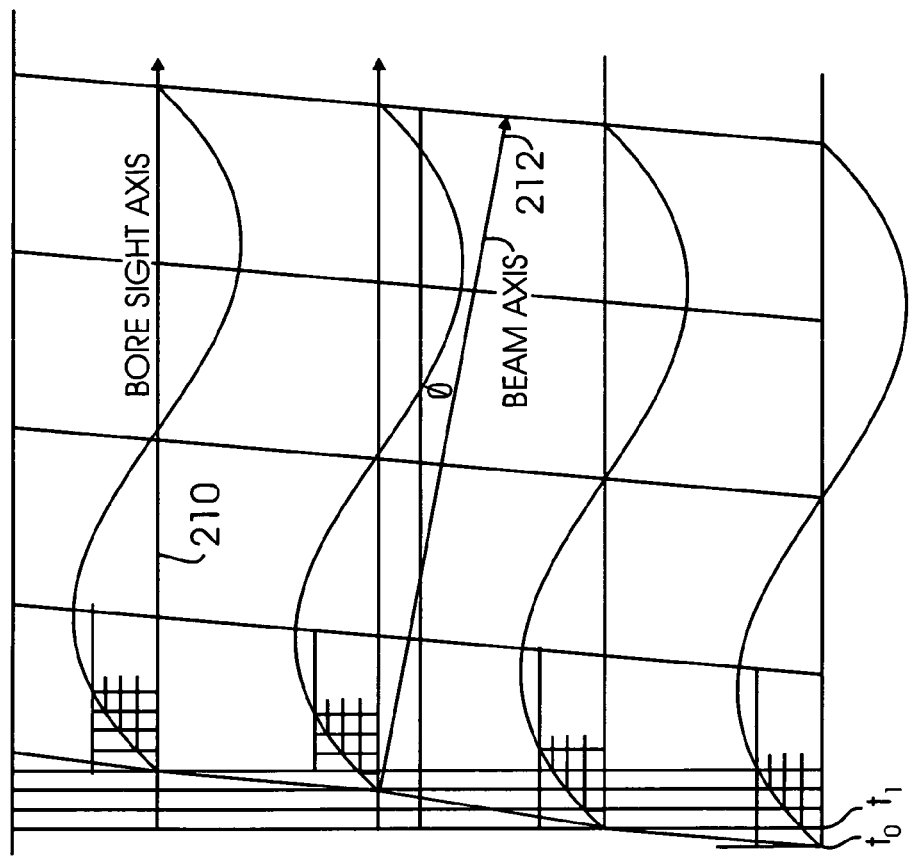
FIG. 2 is a schematic characterization of four active elements, according to one aspect of the present invention.

FIG. 2 schematically shows four active elements, 202, 204, 206 and 208 each radiating a common frequency. Bore sight axis is shown as 210 and beam axis is shown as 212. The active elements are shown in a column. The phase of each of the radiating signals are shifted or delayed by a small amount of time beginning at the origin at $t_0$ and followed by $t_1$ to form a wave front that is 65 degrees counterclockwise to the vehicle (the system carrying the radar antenna array) motion or 25 degrees clockwise from the direction perpendicular to the vehicle motion. The pitch of the array is also adjusted by the phasor so that targets approximately 10 km perpendicular to the vehicle motion can be observed. For longer target ranges, the power of each of the individual power amplifiers is increased to provide a suitable signal to noise ratio.

The optimization method uses a cost factor algorithm that has the effect of minimizing the clutter by putting the sidelobes for transmit beam at the minimum of the sidelobes for receive. The process iterates through the functional characterizations of the transmit and receive beam tapers or shapes using incrementally adjusted sets of weighting functions with each iteration and by comparing the resulting system response with a history of previous responses to obtain movement of the weighting values in the set toward a best fit for the cost factor.

The CF process uses the following formula $$CF = \frac{\int_{main} TX_{main} RX_{main} \, d\, main}{\int_{sl} TX_{sl} RX_{sl} R_{sl} \, d\, sl}$$

where the numerator is integrated over the angular space of a predefined main lobe region and the denominator is integrated over the angular space of a predefined sidelobe region, and $R_{sl}$ is the scatter response (or radar cross section) of the clutter source as a function of angular position in the sidelobe region. The integrations in practice may be reduced to summations over multiple discreet points. Single point peak or minimum response may be used for the numerator. It is noteworthy that the formula is to illustrate the adaptive aspects of the present invention and not to limit the present invention to any particular formula.

The cost function uses both transmit and receive beam characteristics where TXmain and RX main are the pattern amplitudes across the main lobe regions of the Transmit and Receive Beam gain characteristics. Only the peak value of the main lobe is used in the numerator of the CF function. The TXSL and RXSL values that are shown are the beam gain amplitudes across the sidelobe regions. The goal of the optimizer is to minimize the value of the CF or maximize the value of the reciprocal of the cost function, the 1/CF function.

Figure 3B:
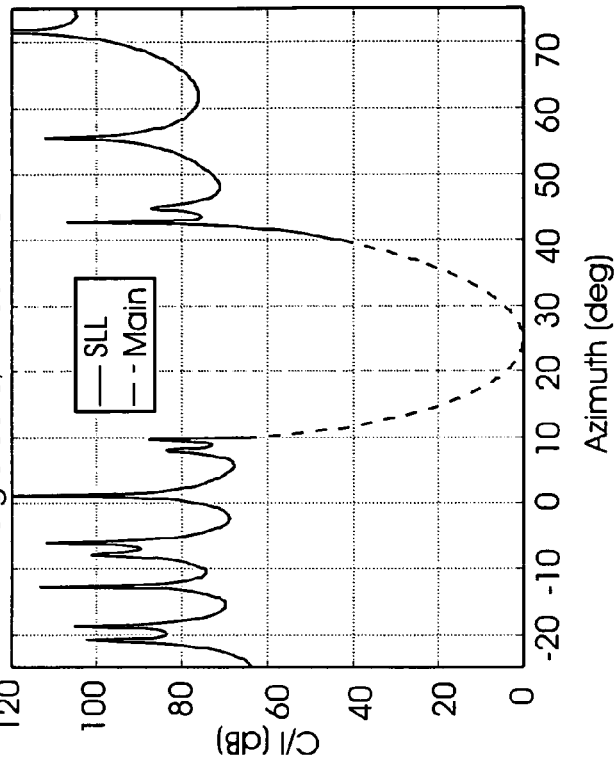
FIG. 3B is a graph of the signal gain pattern of TX*RX, the axis of the beam product being centered at 10 degrees to the right of the bore sight of the antenna, according to one aspect of the present invention.
Figure 3A:
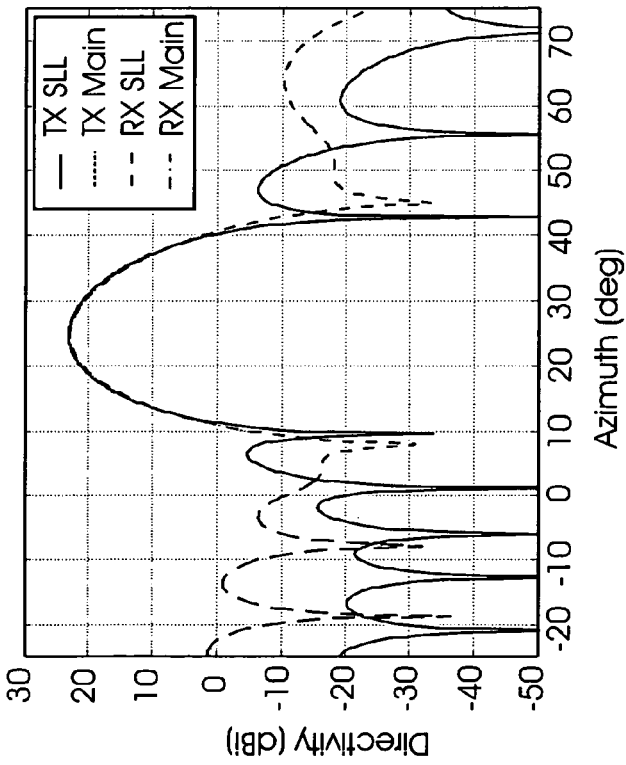
FIG. 3A is a composite graph of the TX (transmit) and RX (receive) signal gain pattern, according to one aspect of the present invention.

FIG. 3A provides an example of a scan of the value of the cost function CF measured in dB over a range in azimuth extending from −20 degrees to 70 degrees with the main lobe centered at +25 degrees. FIG. 3A shows the result of an optimization using the cost function CF, and amplitude taper given by A(r). Plural equally distributed points were used to characterize the gains for the TX and RX sidelobe regions. The optimization process goal is to obtain transmit and receive array amplitude distributions where for this example, the aperture distribution is given by A(r), given as the lower Equations in FIG. 1. In the Equation for A(r), the value of r is the radial coordinate of any point in the array aperture and N and D are the optimized parameters.

FIG. 3A is a composite graph of the TX (transmit) and RX (receive) signal gain pattern of an array of active elements forming a SAR antenna, the axis of the beams being centered at 25 degrees to the right of the bore sight of the antenna. In the example of FIG. 3A, only the azimuth plane was used for optimization, however, the procedure can be extended to the full azimuth and pattern regions.

The graph of FIG. 3A shows a plot of the gains of the transmit and receive beams. The gains of these beams can be obtained by actual measurement or by modeling the taper of the transmit beam and the receive beam functionally and then taking the Fourier Integral of the function over an angle range extending on either side of the bore sight axis (shown as 210 in FIG. 2). Initial tests are performed on a range to verify the fidelity of the analog functions for modeling the transmit and receive tapers. Once the analog function for the taper such as A(r) is confirmed as being suitable for the modeling task, the process proceeds entirely within a computer environment for subsequent variations of the antennas. The main lobe region is related to system sensitivity and the sidelobe region is related to the interference level.

The Graph of FIG. 3B is a plot of the 1/CF function. The graph of FIG. 3B shows the results of a system that has been optimized using the method of this invention. FIG. 3B shows on inspection that the peak of the main receiver and transmitter lobe is approximately 70 dB below the peak of beam sensitivity levels.

The optimizer (502, FIG. 5, described below) achieved this result of FIG. 3B, by minimizing the cost factor algorithm and by iterating sets of values of transmit weighting coefficients and receiver weighting coefficients (D, N) to balance and move the side lobes of the individual patterns so that the peak of one side lobe (e.g. TX beam) tends to match the null between the side lobes of the other (e.g. RX) pattern. This process is performed by a computing system, as described below.

Figure 4:
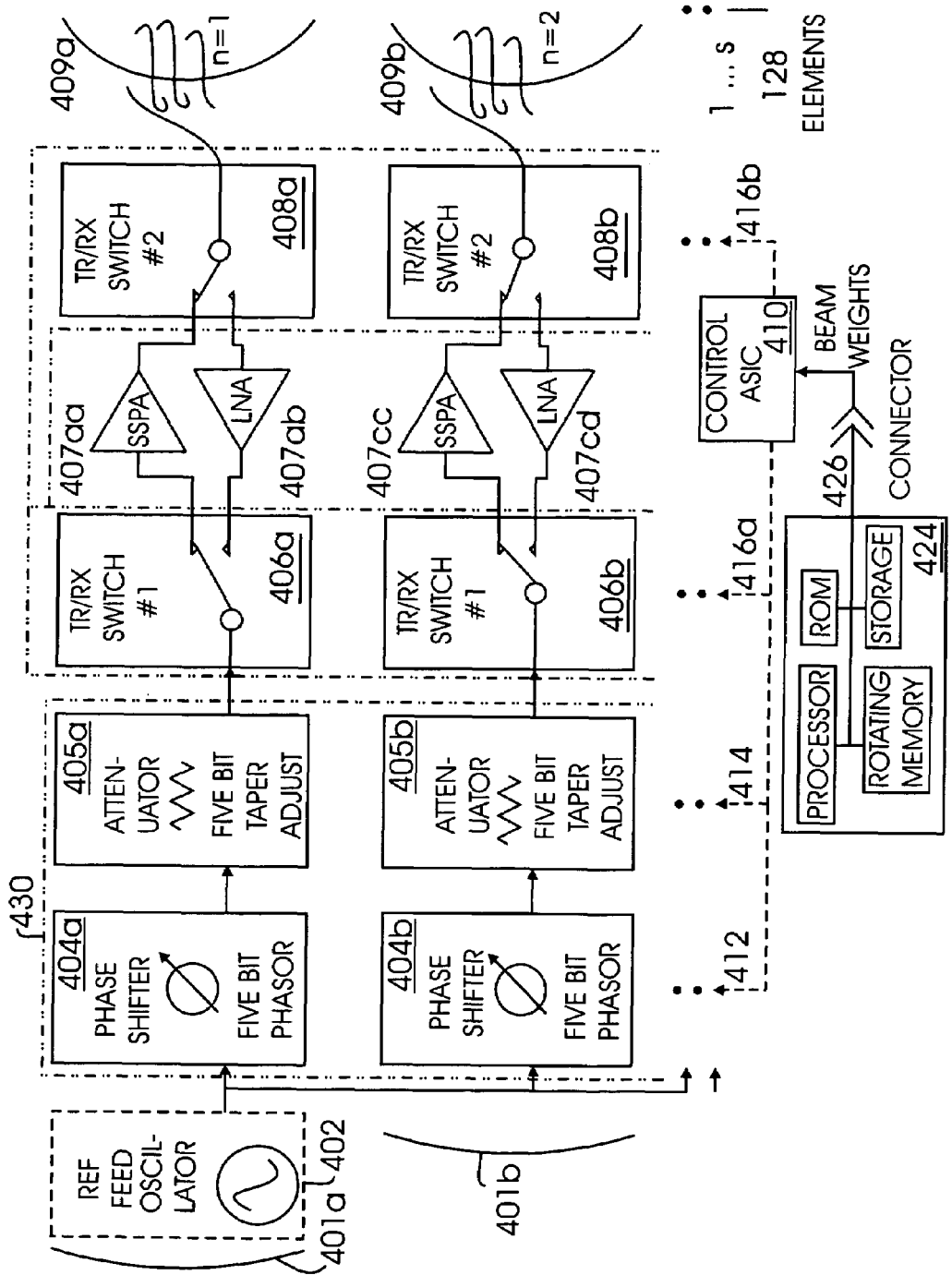
FIG. 4 shows a block diagram illustrating two active element channels of a phase driven beam control system in accordance with an embodiment of the present invention.

FIG. 4 shows two of many array elements in a typical Monostatic Radar With Phase Driven Beam Optimization. A reference feed oscillator ("RF OSC") 402 provides a reference carrier for transmission to each of the array elements (shown as 401a, and 401b). Each array element includes an addressable phase shifter 404a, an addressable attenuator 405a, an addressable first TR/RX switch 406a, an array element specific solid state power amplifier 407aa, an array element specific linear amplifier 407ab, an addressable second TR/RX switch 408a and an array element specific horn/antenna 409a. A second array element 401b is shown with the same array of component elements 404b, 405b, 406b, 407cc, 407cd, 408b and 409b. The transmit beam and the receive beams are both processed through the respective horn/antenna elements (for example, 409a and 409b).

Control (CTL ASIC) ASIC 410 is typically responsive to a signal from a general purpose computer 424 that has a CPU or processor, a Read Only Memory, a rotating memory, Random Access Memory (not shown), non-volatile/volatile memory (not shown) and other storage available. ASIC 410 is initialized by the computer 424 or more typically by another test computer (not shown) during manufacturing/configuration of the antenna system. In operation, computer 424 controls ASIC 410 via a bus such as control bus 426. ASIC 410 controls the components that make up the array elements via data bus 412, 414, 416a, and 416b or the equivalent thereof in function.

It is noteworthy that ASIC 410 and computing system 424 are only shown to illustrate the adaptive aspects of the present invention and are not intended to limit the present invention. For example, computer 424 can execute the computer-executable code directly and generate the final weights. The control ASIC 410 functionality can be included in computer 424. In the alternative, ASIC 410 can execute the optimization code and output the final weights for the antenna. Computer 424 is intended to be a laptop, stand-alone computer, or any computing system that is capable of performing and executing the optimization code.

The control signals to each phase shifter (for example, 404a and 404b) are initially measured during a calibration procedure when the Monostatic Radar antenna assembly begins its first functional test. The control signal sent to each attenuator 405a, 405b for the transmit mode and later for the receive mode are weighting values that shape the taper or the shape of the respective beam by attenuating that component of the beam produced by the array element.

The data sent to the phase shifters is measured to match the time of travel of a signal through the transmit path to the time of travel through the receive path. The phasing signal sent to each phase shifter can be different for each channel and the phase shift signal can also be different for the same phase shifter between transmit and the receive mode. The ASIC 410 changes all phase shift values for the pre-stored transmit and the pre-stored receive values for the transmit and the receive modes.

The phase shifter and the attenuator functions are combined into a beam forming module as illustrated by phantom block 430. The combined beam forming module receives both phase information and taper information from ASIC 410. ASIC 410 provides array element excitations (e.g., amplitude and/or phase settings) to produce the desired antenna transmit and receive beams.

The reference feed oscillator (RF OSC) function 402 represents an oscillator source such as a klystron, or traveling wave tube to provide a common radio frequency (RF). The RF OSC signal is sent to a series of phase shifters (for example, 404a and 404b) after which the phase shifter RF OSC signal is sent to a corresponding Variable Attenuator (for example, 405a, 405b). The T/R Cell is controlled by a signal from CTL ASIC 410 which directs it (the T/R Cell) to couple the output of the SSPA (Solid State Power Amplifier) 407aa, to element 409a, a radiating horn or dipole or cavity that outputs the transmitted pulse signal from the active element channel.

After the transmit mode completes the transmission of transmitted pulses, ASIC 410 simultaneously directs T/R Cells switches (shown as 408a, 408b) to switch input data signals from the outputs of SSPA 407aa, 407cc to corresponding array of linear amplifiers LNA (shown as 407ab, 407cd).

Figure 5:
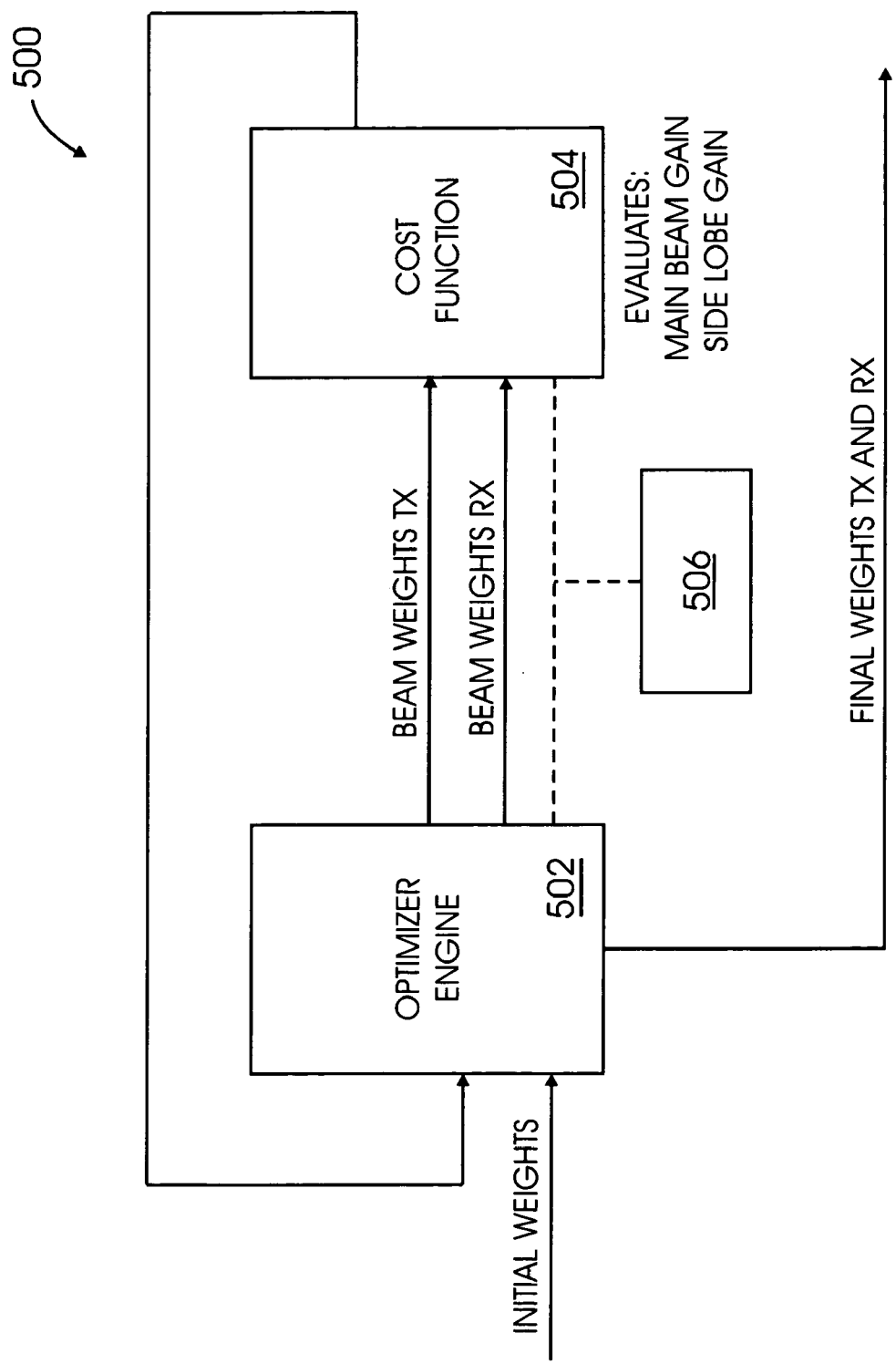
FIG. 5 shows a block diagram of a system that uses a cost function dependent on the interaction of the transmit and receive beams, according to one aspect of the present invention.

FIG. 5 shows a functional block diagram of a system 500 to determine the weighting coefficients for an array antenna system that is under test, using the CF process. The data coefficients necessary for ASIC 410 are calculated using the CF algorithm. System 500 includes an optimizer 502 (labeled optimizer engine) and a cost function evaluator 504. The two functions may be combined into one component or operated as separate components. Software code to execute the optimization function may be stored in memory accessible by the processor (e.g., a computer system such as illustrated by a block 506 (similar to 424)), where the memory may be fixed (e.g., a hard drive) or removable (e.g., a floppy disk, a compact disk, or any other type of recordable medium, whether magnetic, optical, or other type).

Optimizer 502 receives (or may generate) initial input conditions, which may include actual initial array element excitations (also referred to herein as excitations) and input data signals (along with possibly the associated modulation scheme, relative amplitudes, and desired relative beam power). Optimizer 502 provides the initial input conditions to evaluator 504 to evaluate various parameters of interest, such as the main beam gain or directivity, sidelobe gain, or amplifier operating point and others. Evaluator 504 may be viewed as performing a cost function to calculate various parameters of interest and optionally comparing the calculation results to specified goals or requirements.

The results from evaluator 504 are fed back to optimizer 502 which, depending upon the results or number of iterations (loops) scheduled to be performed by system 500, may modify the current array element excitations or Beam Weights TX and RX in an attempt to further optimize the array element excitations. The process is repeated with evaluator 504 evaluating the revised array element excitations. System 500 iterates or loops through the process of optimizer 502 and evaluator 504 a number of times to obtain the final optimal input conditions (including array element excitations). Thus, optimizer 502 provides the optimized array element excitations (e.g., final weights or final values and labeled as final weights D and N to the multibeam phased array antenna ASIC 410 to complete the setup of the multibeam phased array antenna, which for example may be utilized as control signals 412, 414, 416a and 416b in FIG. 4.

System 500 also performs optimization for two or more beams and/or sidelobe analysis using the cost function CF on FIG. 1 to yield improved system performance. In contrast, conventional approaches to multibeam phased array antennas in general provide array excitation element coefficients that satisfy requirements only for each beam independently (i.e., dependent only on the characteristics of each beam in isolation).

System 500 also provides a multibeam optimization option applicable for any number of array element excitations. System 500 can implement the multibeam optimization approach as a time domain analysis or as a frequency domain analysis, subject to its capabilities. When equipped for frequency domain analysis, System 500 frequency domain analysis will generate results in a timelier fashion.

Optimizer 502, is implemented for optimization using Newtonian or slope chasing or other optimizing protocols to find peak or minima values, or it may use a more elaborate conjugate gradient optimizer algorithm or sequential quadratic optimizer algorithm to optimize array element excitations based on the results from evaluator 504.

A Matlab® optimizer from Simulink® has been used to implement a sequential quadratic optimizer algorithm to minimize the worst case cost parameters (i.e., optimize performance based on requirements or goals). The Matlab optimizer "fminimax" may be implemented to synthesize array element excitations that optimize performance or, stated another way, that minimize the worst case cost (e.g., based on results provided by evaluator 504). As another example, optimizer 502 may implement a conjugate gradient optimizer algorithm (e.g., implemented in a software language for example, C+++) to use gradient and curvature calculations to synthesize array element excitations that minimize the worst case cost (e.g., based on results provided by evaluator 504). Alternatively, optimizer 502 may implement an optimization approach, for example, that explores the variable space of the antenna aperture as a quasi-random guess or as genetic algorithms for selecting array element excitations.

Figure 6:
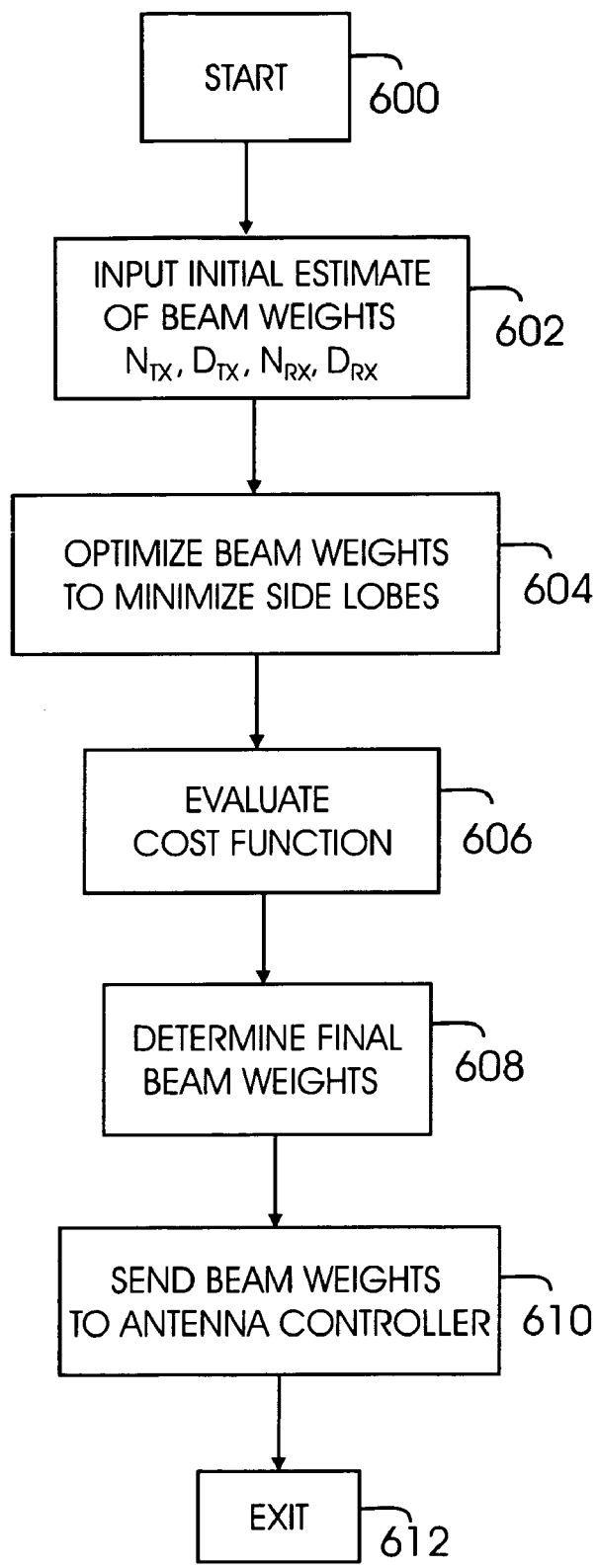
FIG. 6 is a flow diagram for a pattern optimization process for a Monostatic Radar Antenna Optimization in a SAR, according to one aspect of the present invention.

FIG. 6 provides a flow diagram for adjusting the taper coefficients used for input data signals of an array antenna. The method starts with start block 600 and advances to block 602 where initial weights are selected for use in calculating the weights that are fed to the system's attenuators.

Block 602 provides for the step of selecting an initial set of weights for the transmit beam NTX, DTX where T indicates transmit and X indicates the attenuator specific destination of that value of the weight D and the power N to be used in the algorithm for beam intensity. Weighting values NRX and NDX are selected in a similar way relying on past experience for comparable antenna systems for the receive mode.

Block 604 optimizes the beam side lobes, and block 606 evaluates the cost function. These steps using the beam weights to obtain the gains in normalized dB of the transmit beam and the receive beam, the step of finding the peak transmit Gain and the Peak receive beam gain, plugging pairs of transmit and receive gain values into the CF function to obtain pairs of CF values and 1/CF values where the 1/CF for an angle on either side of the bore sight axis and determining if the values of the product of the RX and TX gains are above a predetermined threshold and then adjusting the values of the weights to move the next test on the next cycle to the set of values of the 1/CF function closer to the required limit. The process of adjusting or incrementing the weights on each iteration is the task assigned to the optimizer engine 502. After the 1/CF threshold is exceeded, the process advances to block 608 where the system has determined the final beam weights. This is the step where the final five bit numbers are calculated for the transmitter weights (NTX and DTX) and receiver weights (NRX and DRX). In the last step before exit 612, block 610, sends the beam weights to antenna controller represents the step of actually sending the weights to the ASIC 410 for use in operation.

FIG. 7 (7A-7E) provides a more detailed process flow diagram for adjusting taper coefficients used for input data signals of an array antenna, according to one aspect of the present invention. The process starts in Block 700 and it is followed with block 702 for selecting and loading a set of taper coefficient values for input data into the array antenna. The weighting coefficients, already described above, are listed in block 702. Block 704 is then entered which is a pre-calibration step used to match the delay times for the transmit and receive beams. This step is performed once, before the antenna optimization process starts. Block 708 is a next step via link 706 where variable values are assigned. However it may be necessary to re-initialize the attenuator weighting coefficients based on changes made during the calibration process of 704 for a new antenna assembly.

Block 710 measures the gain of the transmit and receive beams of the array antenna as a function of an angle off an array antenna bore sight axis. Block 710 includes modeling the tapers of the transmit beam and the receive beam using TX-TAPER and RX-TAPER cosine functions with a computer program to model the respective beams. The respective gain pairs are RX and TX which are normalized and scaled as dB values. The RX and TX values are developed by taking the Fourier Transform of the TX and RX weighted taper functions and preparing a table of corresponding values that extend to either side of the antenna bore sight axis.

Block 714 is entered by link 712 and creates pairs of values of normalized TX-Taper and RX-Taper values into distributions that extend symmetrically on either side of a bore sight axis.

In Block 718, the values of TX and RX are transferred for evaluating the cost function. It should be noted again that the numerator of the cost function is only the peak value of the TX and RX main beams. That value is not changed during the processing of the quotient over the angles that extend to either side of the bore sight. A table of 1/CF values are prepared contemporaneously with the CF values.

Block 722 is then entered via link 724. The program evaluates all of the 1/CF values in dB and the corresponding values of the gains in dB in a cost function to determine if the 1/CF (or cost function) results exceed a predetermined limit.

Figure 7A:
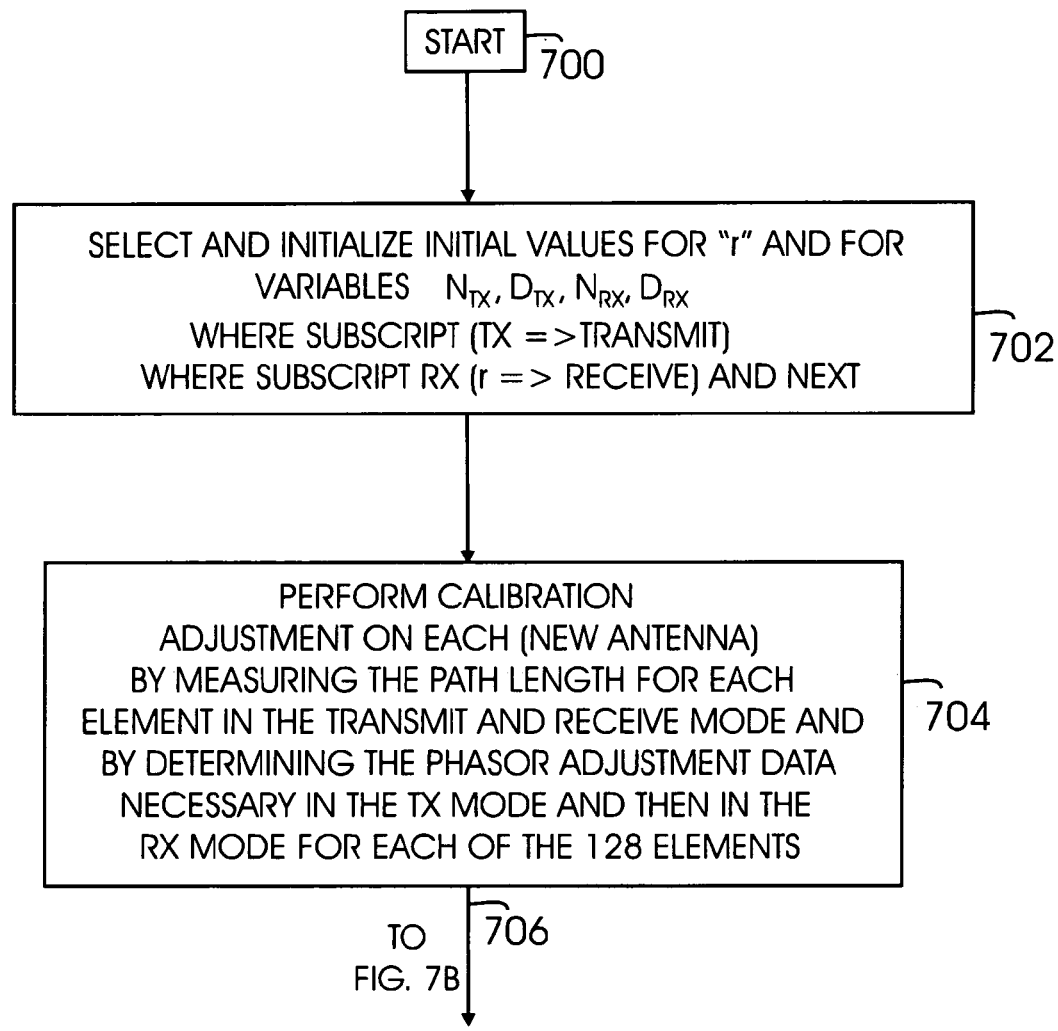
FIG. 7 (7A-7E) shows a process flow diagram for adjusting taper coefficients, according to one aspect of the present invention.
Figure 7B:
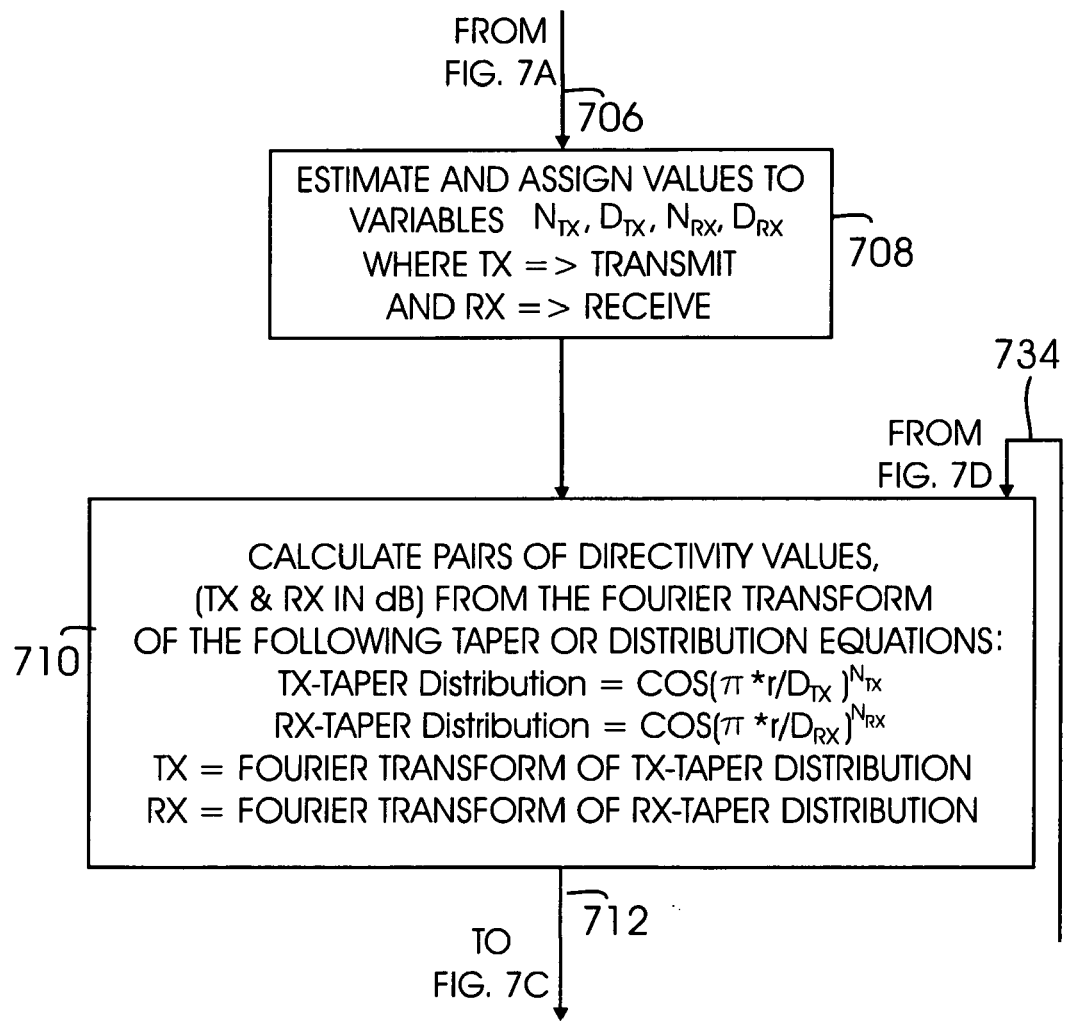
Figure 7C:
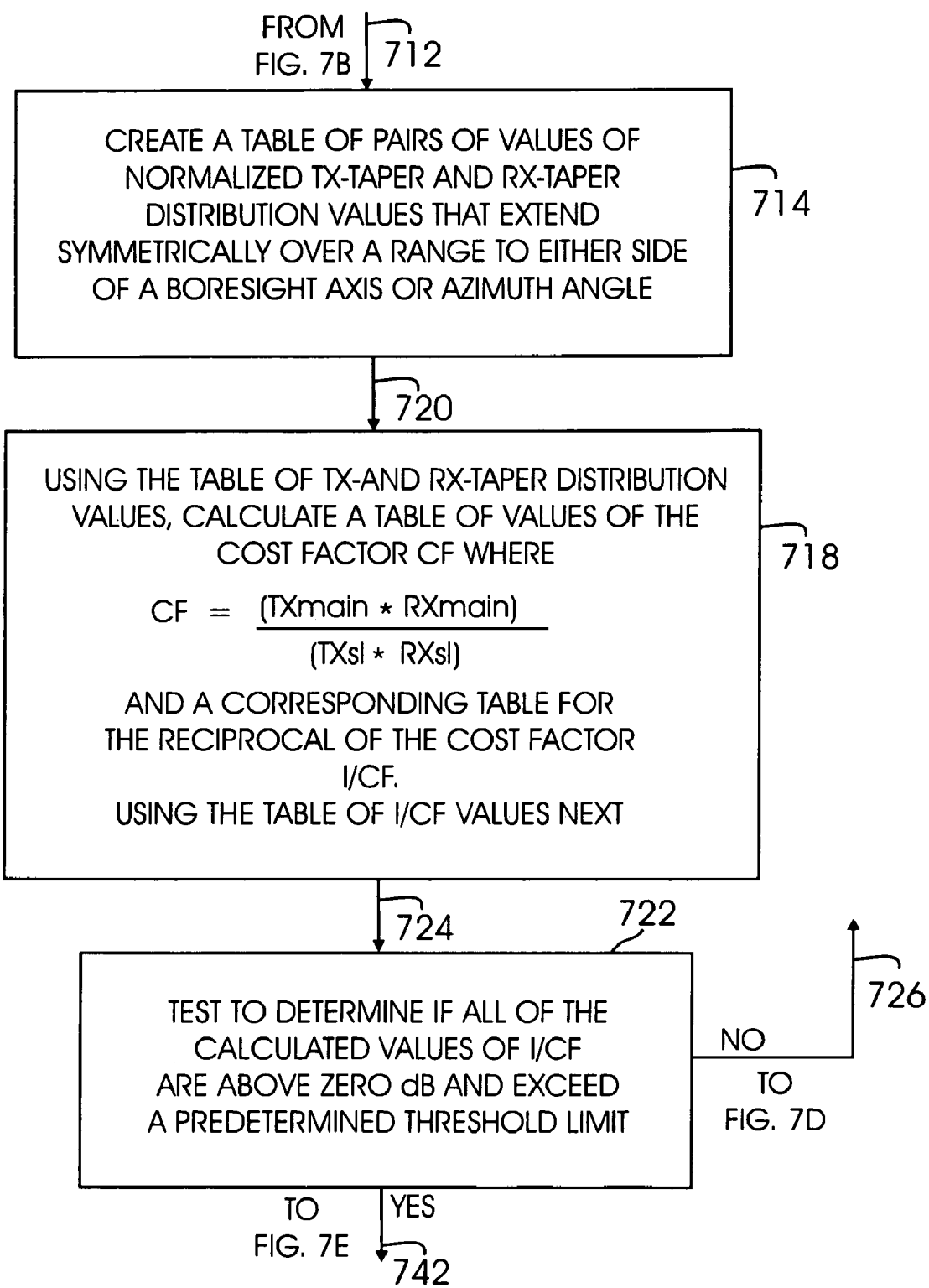
Figure 7D:
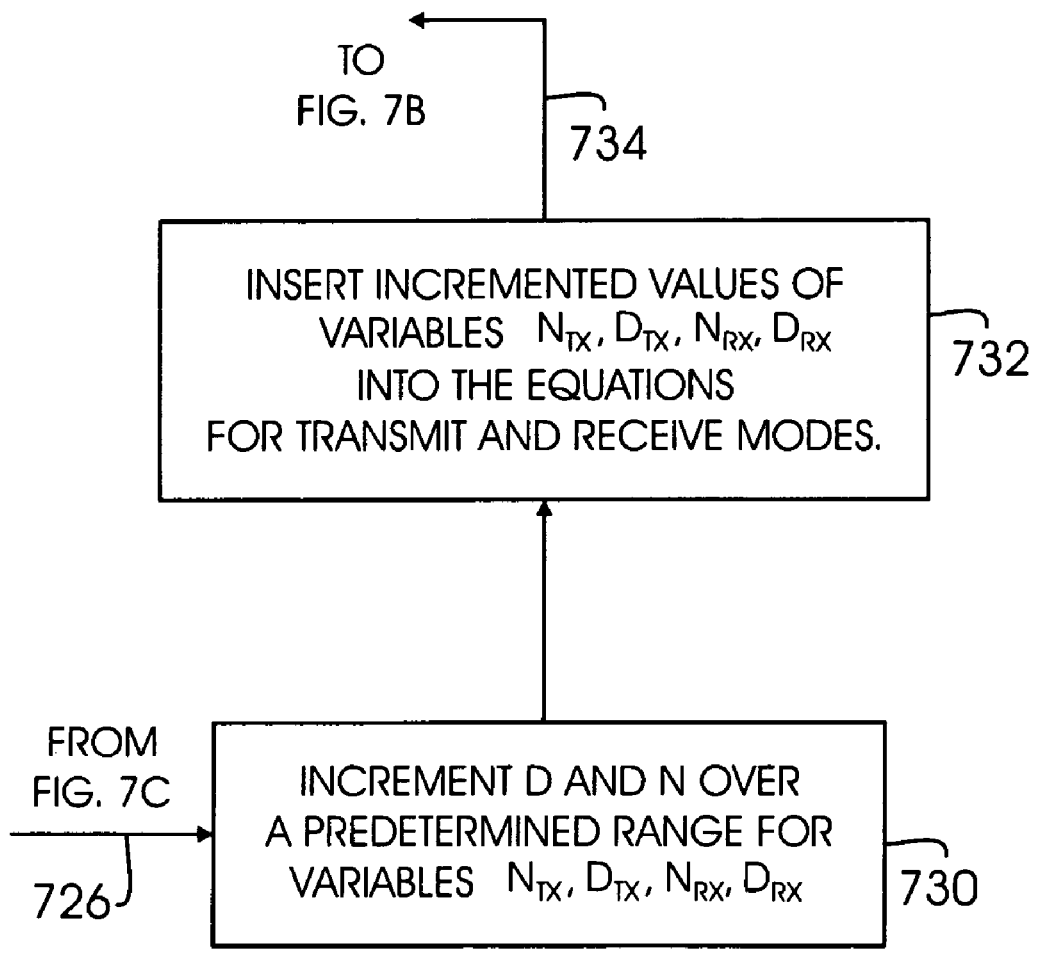

If the predetermined limits for a pass are exceeded and the test fails, the block shows a branching path via path link 726 to block 730 on FIG. 7d where the weights are again incremented after which the program advances to block 732 where the weights are transferred and the program jumps via link path 734 to block 710 on FIG. 7b to begin another iteration.

Figure 7E:
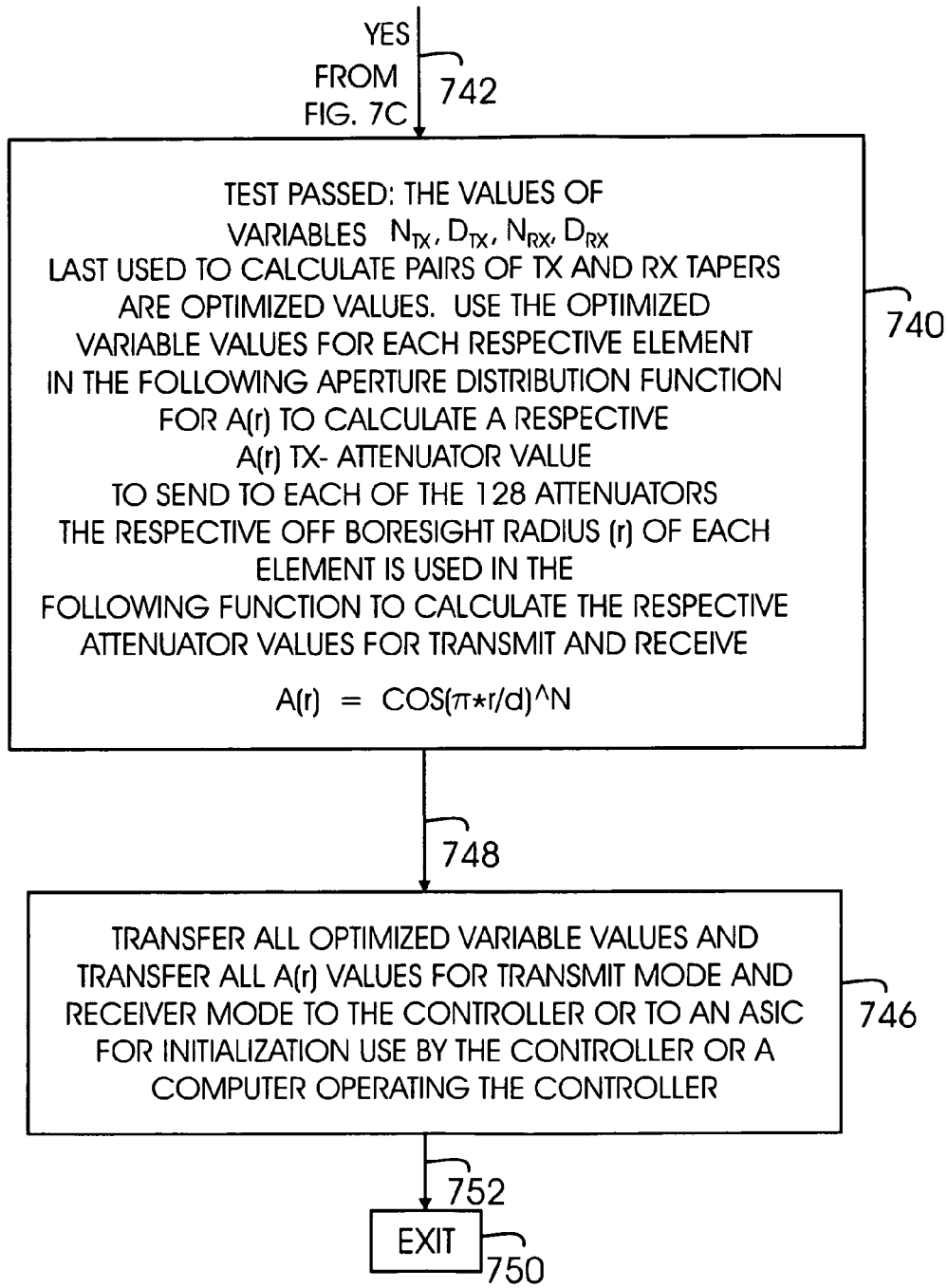

Returning to block 722 on FIG. 7c, if the test passes, the program advances via link 742 to block 740 on FIG. 7e. Block 740 processes the final values of the variables or weights for NTX, DTX, NRX and DRX are processed by a taper function so that they are ready for transfer to ASIC 410 as values for the attenuators. Block 746 is then entered via link 748 where the values of all variables are transferred or burned into the ASIC as the last step before the program exits at block 750 via link 752.

While the present invention is described above with respect to what is currently considered its preferred embodiments, it is to be understood that the invention is not limited to that described above. To the contrary, the invention is intended to cover various modifications and equivalent arrangements within the spirit and scope of the appended claims.

What is claimed is:

1. A method for optimizing transmit beam and receive beam radiation patterns, comprising:
   inputting initial estimates of beam weights for a transmit beam and a receive beam to an optimizer; and
   using a cost function to optimize the beam weights so that
      a response peaks in a main region and is minimized in a sidelobe region;
   wherein the cost function uses characteristics of both the receive beam and the transmit beam.

2. The method of claim 1, wherein taper coefficients are used for input data signals to an array antenna, and the taper coefficients are adjusted during optimization by the optimizer, and the response is from a radar.

3. A method for optimizing transmit beam and receive beam radiation patterns, comprising:
inputting initial estimates of beam weights for a transmit beam and a receive beam to an optimizer; and
using a cost function to optimize the beam weights so that a response peaks in a main region and is minimized in a sidelobe region;
wherein the cost function is based on using characteristics of both the receive beam and the transmit beam;
the method further comprising:
(a) selecting and loading a set of taper coefficient values for input data into the array antenna;
(b) measuring a gain of the transmit beam and the receive beam of the array antenna as a function of an angle off an array antenna bore sight axis;
(c) normalizing the gain of the transmit beam;
(d) evaluating corresponding values of the gain in the cost function to determine if the cost function result exceeds a predetermined limit;
(e) if the predetermined limit is not exceeded, running an optimization program to increment taper coefficient values; and
(f) transferring a last set of taper coefficients to the array antenna for use as input data signals.

4. The method of claim 3, wherein the step of measuring the gain of the transmit beam and the receive beam further comprises:
using an analog taper function with a set of transmit weight and receive weight values which provides the gain for the transmit beam and the gain for the receive beam as normalized gains in decibels as a function of an angle off a bore sight axis for each measured transmit beam gain and receive beam gain.

5. The method of claim 4, further comprising:
generating the transmit beam and receive beam gain values by using executable code to provide values of a Fourier Integral of a taper of the transmit beam and a Fourier Integral of a taper of the receive beam, the values of the Fourier Integrals being normalized.

6. A method for a radar system, comprising:
providing a transmit beam taper function and a receive beam taper function;
initializing the transmit beam taper function with a transmit set of values and the receive beam transmit function with a receive set of values;
normalizing the transmit beam function and the receive beam function to obtain normalized transmit beam and receive beam gain weights that span a predetermined range of angles on either side of an antenna bore sight axis;
using a cost factor function to determine cost factor values and reciprocal cost factor values;
determining if all cost factor values exceed a predetermined number; and
incrementing the transmit beam set of values and the receive beam set of values so that a radar response is minimized in a sidelobe region.

7. The method of claim 6, further comprising:
using a Taper Weighting Calculation Function with a set of transmit beam values and receive beam values to calculate an attenuator transmit beam weights and receive beam weights for each attenuator and transfer the calculated attenuator transmit weights and receive weights to an antenna controller.

8. The method of claim 7, wherein the Taper Weighting Calculation Function is determined by:

$$A(r)=\cos(\pi r/D)^N;$$

where "r" is a radial coordinate of any element in an array aperture and N and D are optimized parameters.

9. A system for optimizing transmit beam and receive beam antenna radiation patterns, comprising:
an optimizer engine configured to receive initial estimates of beam weights for a transmit beam and a receive beam; and
a cost function evaluator configured to receive the initial estimates and to apply a cost function to the initial estimates to optimize the beam weights so that a radar response peaks in a main region and is minimized in a sidelobe region;
wherein the cost function uses characteristics of both the receive beam and the transmit beam.

10. The system of claim 9, wherein the evaluator is further configured to generate an output that may be fed back to the optimizer engine to further optimize the beam weights.

11. The system of claim 10, wherein the optimizer engine is further configured to pass a refined estimate of beam weights for the transmit beam and the receive beam to the evaluator.

12. The system of claim 9, wherein the optimizer engine and the cost function evaluator comprise a single physical component.

* * * * *